United States Patent
Bendeck et al.

(10) Patent No.: US 9,549,393 B2
(45) Date of Patent: Jan. 17, 2017

(54) MOBILE VIBRATORY ALERT SYSTEM AND METHOD FOR LOGGING ALERT TRANSMISSIONS AND RECEPTION OF ACKNOWLEDGMENTS

(71) Applicants: Mauricio Bendeck, Miami, FL (US); Jaime A. Borras, Miramar, FL (US)

(72) Inventors: Mauricio Bendeck, Miami, FL (US); Jaime A. Borras, Miramar, FL (US)

(73) Assignee: TRACTOUCH MOBILE PARTNERS, LLC, Miami, FL (US)

( * ) Notice: Subject to any disclaimer, the term of this patent is extended or adjusted under 35 U.S.C. 154(b) by 0 days.

(21) Appl. No.: 14/837,226

(22) Filed: Aug. 27, 2015

(65) Prior Publication Data

US 2016/0192325 A1 Jun. 30, 2016

Related U.S. Application Data

(60) Provisional application No. 62/042,364, filed on Aug. 27, 2014.

(51) Int. Cl.
| | |
|---|---|
| *H04M 1/00* | (2006.01) |
| *H04W 68/06* | (2009.01) |
| *A61H 23/02* | (2006.01) |
| *H04W 4/02* | (2009.01) |
| *H04W 68/00* | (2009.01) |
| *H04L 12/24* | (2006.01) |
| *H04L 12/26* | (2006.01) |
| *H04M 1/725* | (2006.01) |

(52) U.S. Cl.
CPC ......... *H04W 68/06* (2013.01); *A61H 23/0218* (2013.01); *A61H 23/0263* (2013.01); *H04L 41/069* (2013.01); *H04L 43/106* (2013.01); *H04M 1/7253* (2013.01); *H04M 1/72527* (2013.01); *H04W 4/021* (2013.01); *H04W 68/005* (2013.01); *A61H 2201/0184* (2013.01); *A61H 2201/164* (2013.01); *A61H 2201/165* (2013.01); *A61H 2201/501* (2013.01); *A61H 2201/5015* (2013.01); *A61H 2201/5046* (2013.01); *A61H 2201/5048* (2013.01); *A61H 2201/5069* (2013.01); *A61H 2201/5084* (2013.01); *A61H 2201/5097* (2013.01); *A61H 2205/088* (2013.01); *H04M 1/72558* (2013.01)

(58) Field of Classification Search
USPC .............................. 455/567, 466, 521, 556.1
See application file for complete search history.

(56) References Cited

U.S. PATENT DOCUMENTS

| | | | | |
|---|---|---|---|---|
| 5,848,362 A | * | 12/1998 | Yamashita | H04M 19/04 455/227 |
| 7,130,664 B1 | * | 10/2006 | Williams | H04M 1/7253 340/384.6 |

(Continued)

*Primary Examiner* — Fayyaz Alam
(74) *Attorney, Agent, or Firm* — Patents on Demand P.A.; Brian K. Buchheit; Scott M. Garret

(57) ABSTRACT

A method and apparatus logs alerts and response to alerts for members of an organization. When an alert message is transmitted to a user (i.e. the user's communication device), the alert activity is logged in a record. When the user acknowledges the alert, or fails to respond to the alert, the result is also logged. As such the organization can enforce compliance with alerting procedures and actions to be taken upon receiving an alert message.

14 Claims, 8 Drawing Sheets

(56) References Cited

U.S. PATENT DOCUMENTS

| | | | | |
|---|---|---|---|---|
| 8,291,011 | B2* | 10/2012 | Abu-Hakima | H04L 12/1859 379/37 |
| 8,331,960 | B1* | 12/2012 | Oshinsky | H04W 88/02 455/458 |
| 8,923,804 | B1* | 12/2014 | Aldridge, II | H04W 4/008 455/404.1 |
| 9,173,052 | B2* | 10/2015 | Hauser | H04W 4/008 |
| 2003/0069002 | A1* | 4/2003 | Hunter | G09F 27/00 455/404.2 |
| 2005/0227672 | A1* | 10/2005 | Lauzon | G08B 3/1091 455/412.2 |
| 2006/0116141 | A1* | 6/2006 | Kobayashi | H04L 12/189 455/466 |
| 2009/0239497 | A1* | 9/2009 | Sennett | H04W 76/007 455/404.1 |
| 2009/0325538 | A1* | 12/2009 | Sennett | G08B 27/006 455/404.2 |
| 2010/0146057 | A1* | 6/2010 | Abu-Hakima | H04L 12/1859 709/206 |
| 2012/0190325 | A1* | 7/2012 | Abu-Hakima | H04L 12/1845 455/404.2 |
| 2014/0274010 | A1* | 9/2014 | Cavallaro | H04B 1/385 455/418 |
| 2015/0005038 | A1* | 1/2015 | Cai | H04M 1/72597 455/567 |

* cited by examiner

MOBILE VIBRATORY ALERT SYSTEM AND METHOD FOR LOGGING ALERT TRANSMISSIONS AND RECEPTION OF ACKNOWLEDGMENTS

CROSS REFERENCE

This application claims the benefit of prior U.S. provisional patent application No. 62/042,364 filed Aug. 27, 2014, the entirety of which is hereby incorporated by reference.

FIELD OF THE DISCLOSURE

The present disclosure relates generally to mobile communication and more particularly to vibratory alerting in response to reception of a message in environments where a user's hearing and/or tactile sense may be degraded due to hearing protection, loud ambient noise levels, or both.

BACKGROUND

Mobile communication devices are in widespread usage, particularly in the form of "smart" cellular telephone devices. It is common for such devices to have a "silent" ring mode where, upon receiving a message, or an indication of an incoming phone call, a vibration motor is activated to cause the device to vibrate. Typically in such cases no audible alert (i.e. ringing) is used, although both can be used together if selected by the user of the device.

A common design goal with such devices is, generally, to reduce their size and weight, subject to other design choices such as, for example, display size. This tends to limit the efficacy of vibration devices, leading to people not noticing when the device is vibrating under many conditions. For example, a smartphone carried in a user's pocket while operating a motor vehicle in traffic can result in insufficient vibration and distraction such that the user may not notice the smartphone vibrating in response to an incoming phone call. In louder environments, such as construction sites, where communication can be crucial at times, the vibrations of machinery and construction activities can mask the vibration of a typical smartphone vibration motor completely so that the user does not get alerted to incoming communications.

Another concern of organizations that use alerting and notifications that are transmitted to personnel is compliance with organizational policies regarding responsiveness to alerts. In particular, organizations have an interest in ensuring that the members (e.g. employees) receive and observe notification and alerts while in work areas in order to ensure that personnel can take appropriate action in response to the occurrence of a given event or situation.

Accordingly, there is a need for a method and apparatus for providing vibratory alerts in a way that overcomes the masking effects of ambient conditions without interfering with the generally desirable design goals of mobile communication devices, and there is a further need to ensure that personnel in an organization that uses alerting properly use their assigned alerting device.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
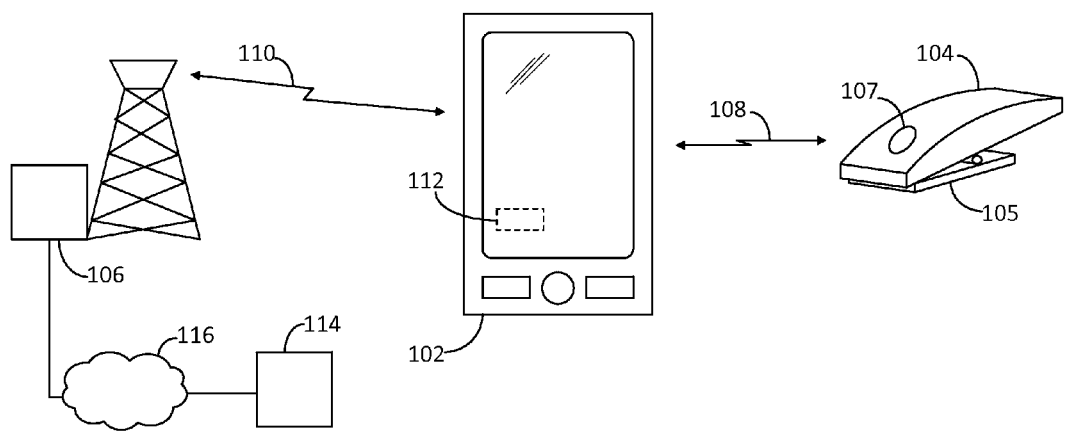
FIG. 1 is a block diagram of a vibratory alert system in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

The deficiencies of the prior are overcome by embodiments that include an alert system comprised of a plurality of communication devices, where each communication device is associated with a respective one of a plurality of users. The system further includes an administration entity that transmits alerts (alert messages) to the communication devices, and receives acknowledgements in response to the alerts, from at least some of the plurality of communication devices. The system also includes a database in which the administration entity maintains a record of alert messages that are transmitted, and acknowledgments received in response to the alert messages, for each user. By logging alerts and responses, an organization can determine compliance rates and act to ensure that its members adhere to organizational policies regarding alerts and notifications. Furthermore, the compliance record can be used by the organization for risk management purposes, such as obtaining discounts on insurance by showing organizational compliance.

FIG. 1 is a block diagram of a vibratory alert system 100 in accordance with some embodiments. The system includes a communication device 102 and a vibration alert accessory 104. The communication device is capable of communicating, via radio signals, with a communications infrastructure 106 such as a cellular network or other wide area radio communications network (e.g. trunked two-way radio) using an appropriate wide area radio channel 110 with a wide area radio transceiver contained in the communication device 102. The communication device 102 can be a smartphone, or similar communication device that is capable of storing and executing program code (i.e. software). In some embodiments the communication device can be a portable two-way radio device (i.e. uses a half-duplex, "always on" communication modality). In general, the communication device contains circuitry to perform conventional communication and computation functions, and input and output functions, as is common in communication devices presently offered for sale.

The communication device 102 contains a vibration alert application 112, which is a program that can be instantiated and executed by the communication device 102, and causes the communication device 102 to perform functions, operations, and behaviors in accordance with the teachings herein. The communication device 102 and the vibration alert accessory 104 are communicatively linked. In some embodiments the link 108 can be a wired link, such as through an audio jack or port of the communication device 102, a serial connection such as a Universal Serial Bus (USB), or other similar wired connections. Using an audio port wired connection, the communication device 102 can generate audio signals of certain frequencies as control signals that can be decoded by the vibration alert accessory 104.

In some embodiments the link 108 can be achieved using a local wireless radio protocol, such as, for example, a wireless link in accordance with the Institute of Electrical and Electronic Engineers (IEEE) specification no. 802.11 (known in industry as "WiFi"), or 802.15 (e.g. the protocol commonly known by the tradename "BlueTooth"), or other similar low power, low range radio communication protocols. The vibration alert accessory 104 can have an identifier that is shared with the communication device 102 so that the communication device 102 and vibration alert accessory 104 can identify each other in wireless communications. The identifier can be, for example, the media access control (MAC) address of each device's respective network interface circuit, as is known.

Because the vibration alert accessory 104 is not subject to the design constraints (e.g. low weight, thin or small volume) of the communication device 102, it uses a more robust vibration system than can be placed in communication devices, which obviates the need for a larger communication device 102 that does incorporate such a vibration system. Accordingly, the vibration alert accessory 104 can produce vibrations having amplitude on the order of 5-10 times or more than that of a typical vibration motor used in communication devices. The vibration alert accessory 104 can include a clip 105 on an external portion of a housing of the vibration alert accessory 104 so that it can be clipped onto a user's clothing in a place that will help ensure the user/wearer feels vibrations produced by the vibration alert accessory 104. Other form factors can be employed as well, where, for example, the vibration alert accessory can be formed into a helmet or as a bracelet or anklet, for example.

Briefly, the communication device 102, upon receiving a message (i.e. call alert, voice communication, short message system or "text" message, etc.), transmits an alert message to the vibration alert accessory 104 over link 108 (either wired or wireless). In some embodiments the communication device 102 analyzes the received message to determine a category or other classification of the message and selects or indicates a corresponding alert pattern to be used by the vibration alert accessory 104, and indicates the category in the alert message sent via link 108. The vibration alert accessory 104, upon receiving the vibration alert message, carries out the vibration alert in accordance with the indicated category or classification, using the corresponding vibration pattern. The different vibration patterns allow the user to determine the general nature of the incoming message received by the communication device 102 without having to look at the communication device 102. In some embodiments the vibration alert message can indicate an immediate emergency, prompting the user to take action. In some embodiments the vibration alert accessory 104 can include a user input means, such as a button 107, to indicate that the user has detected the alert. The vibration alert accessory 104 can, upon receiving such user input, can transmit an indication of the input to the communication device 102 so that the vibration alert application can make note that the user has acknowledged the alert. The communication device 102 can, in response, transmit an indication of the user's acknowledgement of the alert to an administrator server 114 or other similar entity to record the user's acknowledgment of the alert. The administrative server 114 can be a backend server operated by an entity with which the user of the communication device 102 is associated, and can be connected to the wide are radio communications network 106 via a wide area data network 116 such as, for example, the Internet. In another embodiment, the vibration pattern is preselected by the user according to its level of priority and per contact name or groups of contacts.

Figure 2:
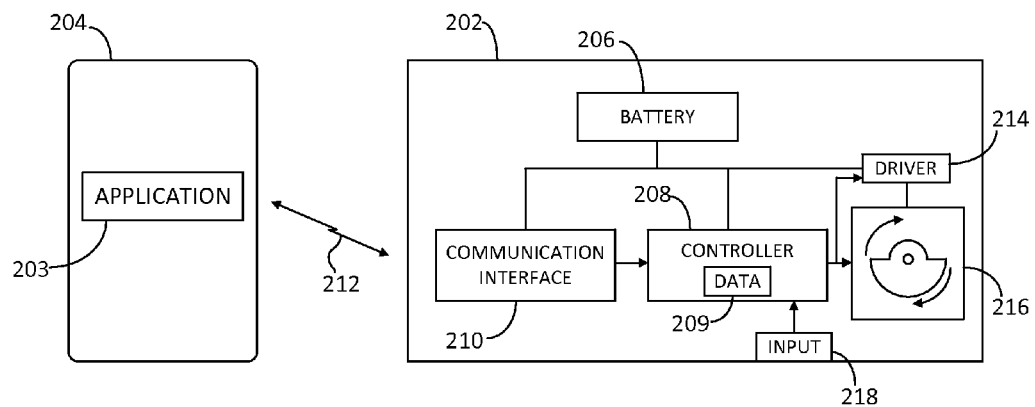
FIG. 2 is a block schematic diagram of a communication device and a vibration alert accessory in accordance with some embodiments.

FIG. 2 is a block schematic diagram 200 of a communication device 204 and a vibration alert accessory 202 in accordance with some embodiments. The communication device 204 includes general computing circuitry that can operate an operating system such as, for example, that known by the trade name "Android," by Google, Inc. The computing circuitry can include internal memory and connector means for accepting external memory such as, for example, a memory card. Accordingly, the communication device 204 can execute a vibration alert application 203 that can be installed in the communication device 204. The application 203 allows the communication device 204 to interact with the vibration alert accessory 202 over a communication channel 212, which can be wired or wireless. The vibration alert accessory 202 includes a battery 206 for providing power to circuitry in the vibration alert accessory 202, including a communication interface 210, a controller 208, a vibration motor 216 and a motor driver circuit 214.

The controller includes memory that contains vibration pattern data 209. When the communication device 204 receives a communication intended for the user of the communication device 204, it transmits a vibration alert message to the vibration alert accessory 202 over the communication channel 212. The vibration alert message is received by the communication interface 210 and provided to the controller 208. The controller can determine which of a plurality of vibration patterns to use, based on the contents of the vibration alert message, and select an appropriate or corresponding pattern from the vibration pattern data 209. The patterns can specify variations in magnitude of the vibrations, as well as variations in time (e.g. duty cycle). Once the vibration pattern is selected, the controller 208 controls the driver circuit 214 to cause the motor 216 to create vibration in accordance with the selected pattern. The vibration motor 216 can employ an eccentric cam which, upon being rotated by the motor, creates vibration, as is known. The vibration alert accessory 202 can also include a user input means, such as a button 218 to acknowledge the vibration alert. Upon pressing the button 218, the controller 208 can control the driver 214 to cease rotation of the vibration motor 216 to conserve battery energy. In some embodiments, upon the user acknowledging the alert by, for example, pressing the button 218, the controller 208 can generate an acknowledgment message that is sent to the communication device 204 over the communication channel 212 for use by the vibration alert application 203. In some embodiments the acknowledgement occurs when the user answers the voice call or text using the communication device 204. Thus, input via the button 218, or operation of the communication device 204, in response to a vibration alert, can be taken by the application 203 as an acknowledgement of the alert. If the user answers the call or otherwise operates the communication device in response to the alert, the application 203 will send a message to the vibration alert accessory 202 to cease the vibration alert.

The battery 206 can be a rechargeable battery that can be removed and charged in a separate charger, or charged by connecting the vibration alert accessory 202 to a charger, either by wire or by wireless coupling (e.g. inductive charging). In some embodiments, the battery can consist of multiple non-rechargeable alkaline cells. The controller 208 can periodically send battery status messages to the vibration alert application 203 to be displayed on the communication device 204 so that the user can see the charge remaining in the battery 206.

Figures 3, 4:
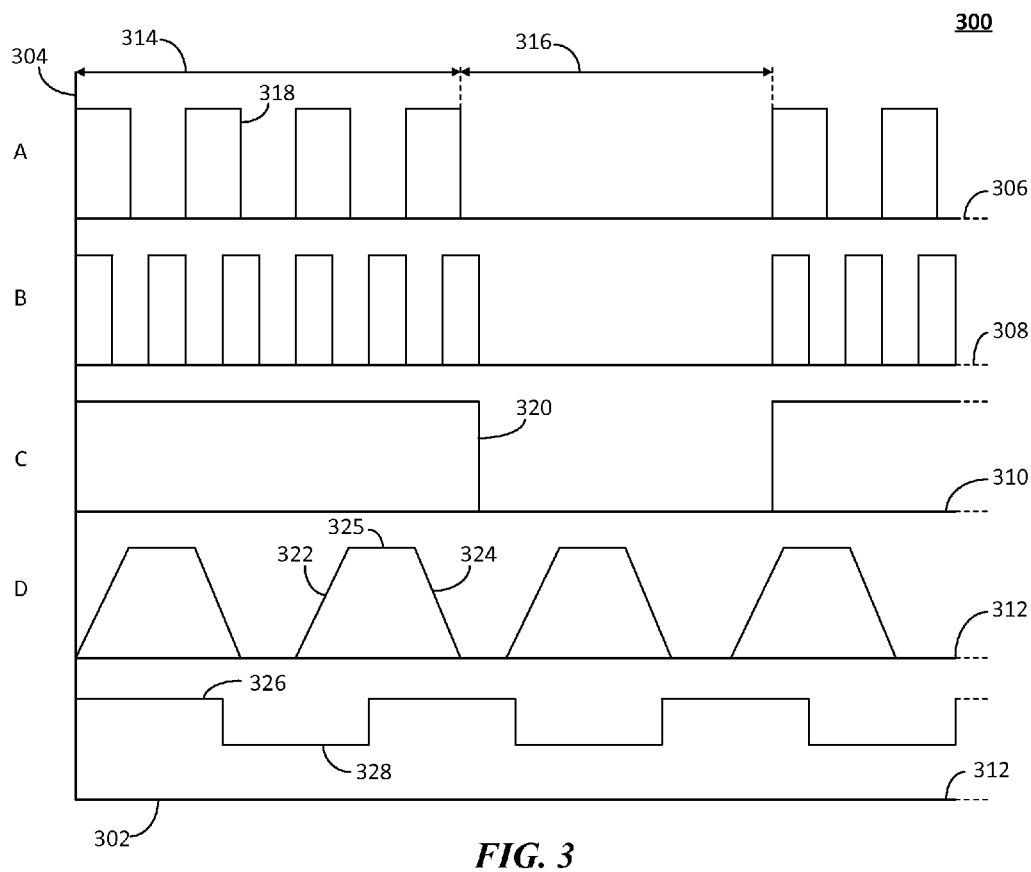
FIG. 3 is a graph chart of a several exemplary vibration patterns to be used by a vibration alert accessory in accordance with some embodiments.
FIG. 4 is a table for storing vibration pattern identifiers and a corresponding vibration pattern data for use by a vibration accessory in accordance with some embodiments.

FIG. 3 is a graph chart 300 of several exemplary vibration patterns to be used by a vibration alert accessory in accordance with some embodiments. The horizontal axis 302 represents time, increasing to the right, and the vertical axis 304 represents vibration magnitude, increasing toward the top. The magnitude can be expressed in terms of acceleration relative to Earth gravity, g. A typical smartphone vibration motor can produce an acceleration of about one g. In some embodiments, the vibration motor of the vibration alert accessory can produce an acceleration of at least five g, meaning five times more acceleration than Earth gravity. The magnitude of the vibrations, for rotary-based vibration motors, is dependent on the mass of the eccentric cam and the rotational velocity at which the vibration motor spins the eccentric cam.

In some embodiments the vibratory system can include a mass that is linearly oscillated back and forth along an axis. For example, a toroidal permanent magnet can be mounted on a rod with biasing springs on either side to urge the toroidal magnet into a center of the rod. Windings of opposing polarities can be wound around respective halves of the rod, allowing the toroidal magnet to move inside the windings. By passing current through one of the windings a magnetic field is created that causes the toroidal magnet to move. Thus, by varying the magnitude of the current, that magnitude of the magnetic force acting on the toroidal magnet can be varied, allowing different magnitude (i.e. force) of the vibration of the toroidal magnet. By alternating the energizing of the coils, the toroidal magnet can be thus caused to oscillate back and forth on the rod in a way that allows independent control of magnitude and frequency of the oscillations.

Four exemplary vibration patterns, 306, 308, 310, 312, 313 are shown. Many other such patterns can be formed in accordance with the teachings herein. The patterns can be periodic, and repeated one or more times by the vibration alert accessory. In exemplary pattern 306 during a first portion 314 a series of pulses 318 occur where, in each pulse, the vibration motor is turned from an off state to an on state at a selected amplitude. Then during a second portion 316 no pulses occur and the vibration motor remains off. The pattern can repeat portions 314 and 316. In some embodiments the vibration pattern can be repeated for a preselected period of time or until a user input is received indicating acknowledgement of the vibration alert. The number of pulses can be varied for other patterns to be used for other alerts. For example, a user can give priority to various contacts in an address book on the user's communication device. Contacts can be given a priority from 1 to 4, which can correspond to vibration patterns using 1 to 4 pulses in portion 314. Pattern 308 shows an example of a pattern similar to that of pattern 306, but with more pulses having shorter duration per pulse, and possibly at a different amplitude. Pattern 310 shows an example of one long pulse followed by an off period. Pattern 312 utilizes ramp up 322 and ramp down 324 segments, and a constant amplitude portion 325. During the ramp up and ramp down segments 322, 324 the vibration amplitude increases over time and decreases over time, respectively. In pattern 313 the vibration is continuous, but the magnitude is periodically varied from times of relatively high magnitude 326 and times of relatively lower magnitude 328. Other patterns can exist that change over time. For example, a vibration alert can start with a relatively low magnitude and ramp up in magnitude until receiving an acknowledgement input from the user. Likewise, patterns can be mixed; for example, a ramp can be followed by a series of pulses.

As mentioned various combinations of pulse length, ramp length, amplitude, and pattern period can be used to create unique vibration patterns, which can be assigned to different categories of incoming messages. Both the duty cycle and vibration magnitude can be modulated in various ways to create unique patterns that can be discerned though tactile sensation by a user wearing the vibration alert accessory. In some embodiments the vibration alert application on the communication device can allow a user to select vibration patterns for various categories (a particular contact in the user's address book can be considered to be a category). In some embodiments the vibration alert application on the communication device can allow a user to create vibration patterns which can be stored and assigned to a category by the user.

FIG. 4 is a table 400 for storing vibration pattern identifiers and corresponding vibration pattern data for use by a vibration accessory in accordance with some embodiments. The table 400 can be stored, for example, in the vibration alert accessory, and can included preset patterns as well as user-specified patterns. In some embodiments the table 400 is stored only in the communication device, and upon receiving a message, the communication device can send the vibration pattern data to the vibration alert accessory in the alert message. Each entry in the table includes a vibration pattern identifier 402 and corresponding vibration pattern data 404. The vibration pattern data can be used by the controller of the vibration alert accessory to drive the motor so that it vibrates in correspondence to the vibration pattern data. In some embodiments when the communication device receives a message, the communication device can determine the vibration pattern to be used and send only the vibration pattern identifier in the alert message. The vibration alert accessory can then use the vibration pattern identifier to locate the corresponding vibration pattern data in the table 400. In some embodiments the table 400 can include preset patterns 406 that are programmed into the table upon manufacture of the vibration alert accessory, as well as user specified or created patterns 408.

Figure 5:
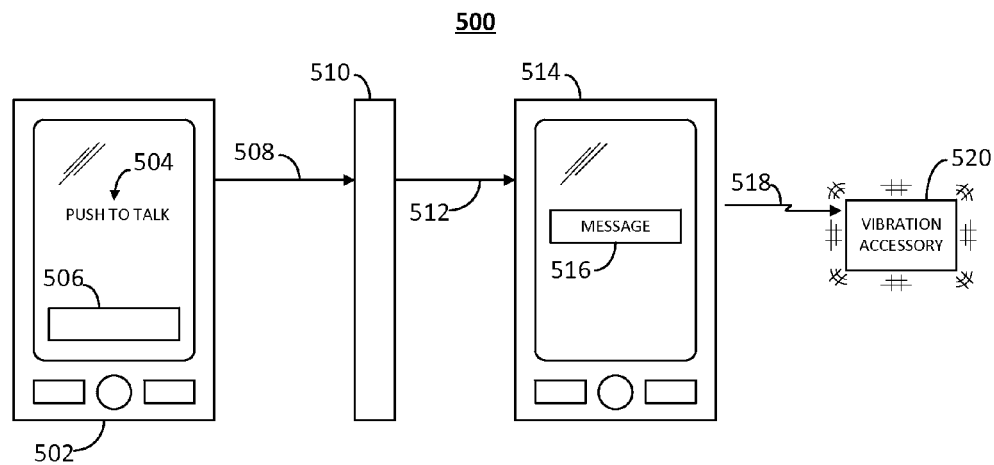
FIG. 5 is system diagram of a push to vibrate alert system in accordance with some embodiments.

FIG. 5 is system diagram of a push to vibrate alert system 500 in accordance with some embodiments. In some embodiments a vibration alert application program can provide a "push to talk" (PTT) functionality. In some embodiments the communication devices can be designed to have a dedicated PTT button that is mechanically actuated by a user to activate transmission, as is well known. PTT functionality allows a user at a first communication device 502 using the vibration alert application 504 to provide an input such as, for example, a "press" or touch input at graphical representation of a button 506. Alternatively, a PTT button can be provided on the device 502, in accordance with conventional two-way radio communication. Upon pressing the graphical button 506, or the mechanical PTT button when the first communication device 502 is designed as a portable two-way radio device, the first communication device 502 turns on its microphone to receive speech from the user of the first communication device 502, which is transmitted in real, or near-real time to a second communication device 514. The speech signal can go from the first communication device 502 to a communication system 510, as indicated by signal 508. The communication system 510 re-transmits the signal to the second communication device 514 as indicated by signal 512. As the signal 512 is being received at the second communication device 514 the second communication device plays the received speech over a loudspeaker or other audio component of the second communication device 514. The second communication device 514, while receiving the signal 512, can also record the signal to allow some playback of the content of the signal 512. Under normal conditions the volume of the loudspeaker of the second communication device 514 is loud enough to be heard by a user of the second communication device 514 (assuming the user is near enough) without having to hold the second communication device 514 to the second user's ear (e.g. like a phone). The second communication device 514 can produce a conventional audible alert, however, since the user may be located in a noisy area, or may be wearing hearing protection. The second communication device 514 can send an alert message 518 to an associated vibration alert accessory 522, indicating a vibration pattern. The second communication device 514 can also provide a visual alert 516 to further indicate the incoming message. In some embodiments, when the first and second communication devices are near enough to each other, they can signal each other directly, without need for the infrastructure of the communication system 510.

In some embodiments the communication devices 502, 514 can include a message analyzer function that analyzes the content of the message to determine if there is an indication of a special condition that requires a special alert. For example, if the received message is a speech message, as in a PTT voice signal, the message analyzer can include a voice analyzer that determines whether the speaker's voice indicates stress or commands. For example, the user of the first communication device 502 can see a condition which presents an imminent threat to the user of the second communication device 514, and using the PTT function can yell "LOOK OUT!" The emphatic nature of the speech can be detected by the message analyzer of the second communication device 514 and in response, the second communication device 514 can send an alert message 518 to the vibration alert accessory that corresponds to an imminent danger so that the user of the second communication device 514 can survey the situation and take appropriate action. In some embodiments the message analyzer can examine the contents of a received text message for code words or commands that require special alerts, and indicate such in the alert message sent to the vibration alert accessory.

Figure 6:
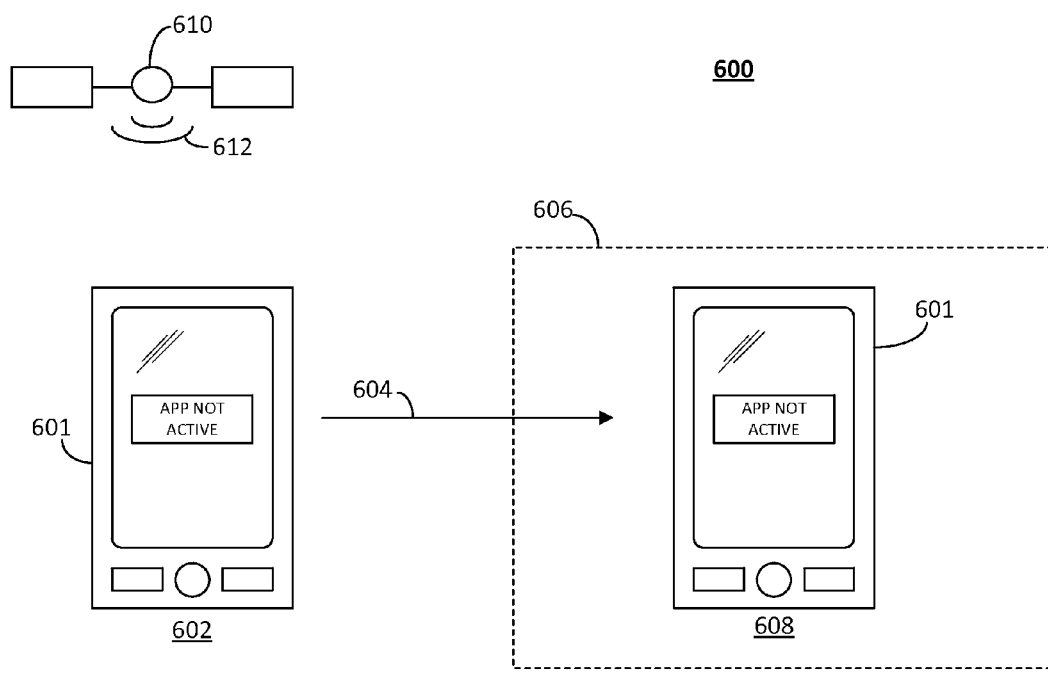
FIG. 6 is a system diagram showing geo-fencing of a vibration alert application in accordance with some embodiments.

FIG. 6 is a system diagram showing geo-fencing 600 of a vibration alert application in accordance with some embodiments. A communication device 601 is shown in a first location 602 that is out of a geo-fenced region 606. The geo-fenced region 606 is a geographically defined region, such as, for example, a construction site. Outside of the geo-fenced region the vibration alert application can be configured to not send alert messages to the associated vibration alert accessory. The geo-fenced region can be defined by a location coordinate and a distance (i.e. defining a circle where the distance is the radius of the circle). In some embodiments the geo-fenced region 606 can be defined by a polygon having a plurality of vertices, each defined by a coordinate location. The coordinates can be given, for example, in latitude and longitude. The communication device 601 can include a satellite positioning receiver to receive positioning signals 612 from positioning satellites 610 to determine its location, as is known. For example, the vibration alert application on the communication device 601 can request location updates from the satellite positioning receiver, and compare the present location of the communication device 601 to the geo-fenced region 606. When the communication device 601 moves from position 602, as indicated by arrow 604, to position 608 inside the geo-fenced region 606, the vibration alert program can determine that the communication device 601 is in the geo-fenced region 606 and commence sending alert messages to the vibration alert accessory. If the communication device 601 is then moved out of the geo-fenced region 606, the vibration alert application can detect that the communication device 601 is out of the geo-fenced region and cease sending alert messages. By essentially turning on alert messaging only in selected geo-fenced regions, battery life of the vibration alert accessory can be prolonged. In some embodiments, entry and exit into and out of geo-fenced regions can be recorded by the vibration alert application.

Figure 7:
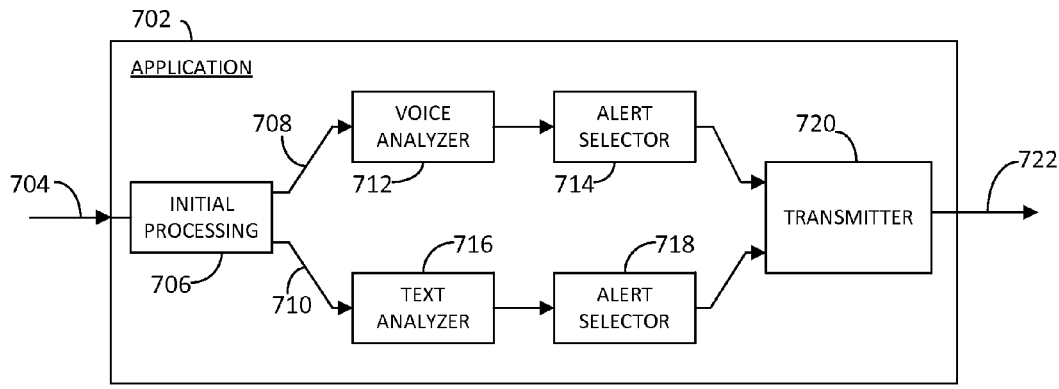
FIG. 7 is a message analysis diagram for a vibration alert application used in a communication device in accordance with some embodiments.

FIG. 7 is a message analysis diagram 700 for a vibration alert application 702 used in a communication device in accordance with some embodiments. As a message 704 is received by the vibration alert application 702, some initial processing can be performed at block 706 to determine what kind of message is being received. The message can be, for example, a voice message such as a PTT message containing speech, or the message can be text. Furthermore, other types of messages can be received, such as, for example, incoming phone call pages from a cellular phone network. For the purpose of discussion here, the example of FIG. 7 addresses voice and text messages, and those skilled in the art will understand that the same principles can be adapted to other types of messages.

A voice message 708 is analyzed by a voice analyzer function 712, which can look for voice characteristics that indicate, for example, stress in the speaker's voice, an indication of imminent danger, or other conditions that can dictate that special alerting is used. Once analyzed, an appropriate alert (i.e. vibration pattern) is selected by alert selection function 714. The alert selected can correspond to a category of the received message, such as who it is from, whether it is work related or personal related, or a special alert type, and so on. The alert selection function 714, upon selecting an appropriate alert, forms an alert message that is provided to the transceiver 720 for transmission to the vibration alert accessory, which implements a vibration pattern in correspondence with that selected by the alert selection function 714.

Likewise, a text message 710 can be analyzed by a text analyzer 716, which can look at the source of the text message, as well as the content of the text message. Generally the source of the text message will dictate the category of the alert unless some special words or a code appear in the text massage that dictate a special alert be used. Once the text message is analyzed, an alert selection function 718 selects the appropriate vibration pattern to be used in alerting the user and forms an alert message which is provided to the transceiver 720 for transmission to the vibration alert accessory.

Figure 8:
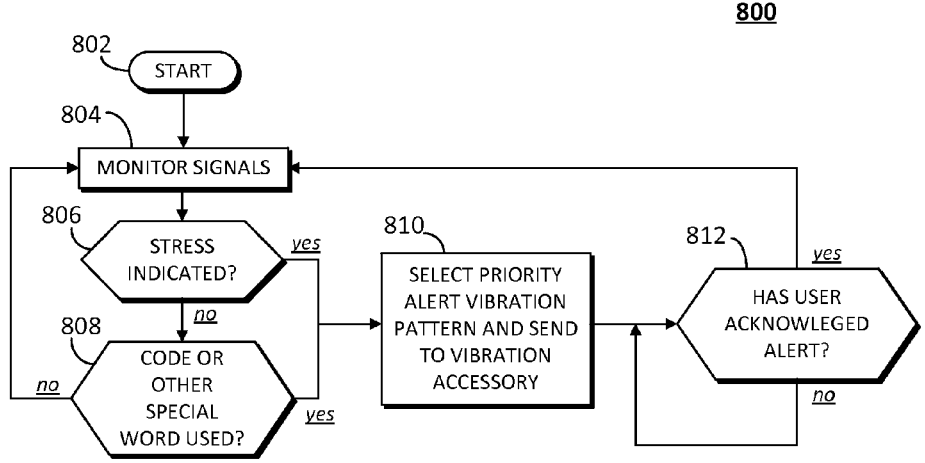
FIG. 8 is a flow chart of a method of analyzing messages received by a communication device using a vibration alert application in accordance with some embodiments.

FIG. 8 is a flow chart 800 of a method of analyzing messages received by a communication device using a vibration alert application in accordance with some embodiments. At the start 802, the vibration alert application is executing on the communication device, and has verified that the vibration alert accessory is present and has established a link with the vibration alert accessory. In step 804 the method 800 commences monitoring signals (messages) received at the communication device. When a message is received, the method 800 proceeds to step 806 where the message is analyzed based on its type, source, and possible content. For example, if the message received indicates a stress situation, such as if the message is a voice message and the speaker appear to be shouting then a special alert type may be indicated. In step 808 the method 800 can look for other conditions, such as the presence of commands or code words in the message (text or voice). In step 810 the method 800 selects and sends the appropriate alert and vibration pattern for the alert to the vibration alert accessory. In step 812 the method can allow the user to acknowledge the alert by, for example, pressing an acknowledgement button on the vibration alert accessory while it is vibration or playing the selected vibration pattern. The method 800 can be modified in accordance with other teachings disclosed herein, such as by, in step 804, determining a location of the communication device and only proceeding when the communication device is located within a designated geofenced alerting region. Likewise, the method 800 can be set to commence only during specified times, such as during work hours.

Figure 9:
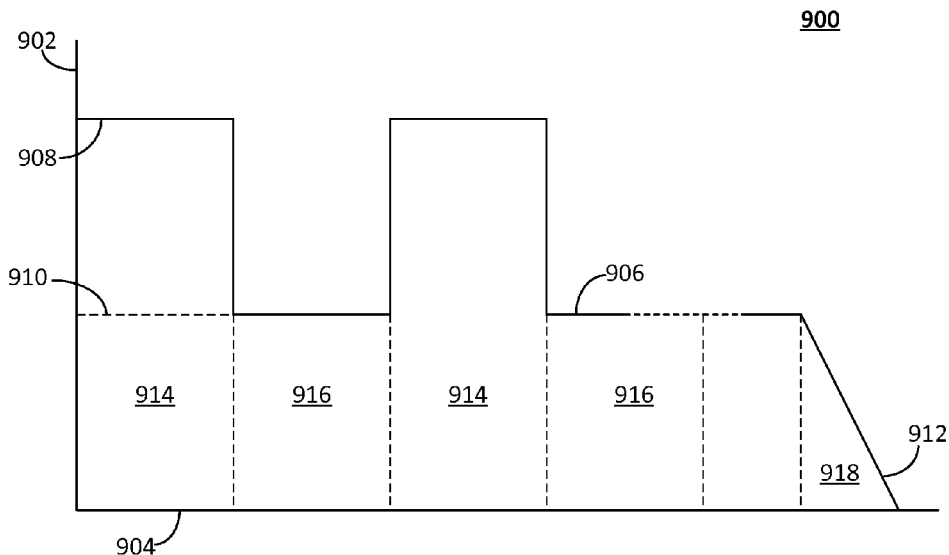
FIG. 9 is a graph chart showing vibration patterns using different magnitudes of vibration in accordance with some embodiments.

FIG. 9 is a graph chart 900 showing vibration patterns using different magnitudes of vibration in accordance with some embodiments. The vertical axis 902 represents vibration magnitude, increasing in the upwards direction. Magnitude can be expressed, for example, as the force generated by the rotation of the eccentric mass by the vibration motor, which can be controlled by the rotational velocity (expressed in revolutions per minute, for example). Since the vibration alert accessory can use a larger vibration motor than is used in portable communication devices, the magnitude of the vibrations produced by the vibration alert accessory are much larger, up to an order of magnitude larger in some cases. The horizontal axis 904 represents time, increasing to the right. The vibration pattern can commence for a first interval 914 at a first magnitude 908. At the end of interval 914, the amplitude can be lowered to magnitude 910 for a second interval 916 rather than ceasing vibration (e.g. as in FIG. 3). The different magnitudes 908, 910 can be repeated in first and second intervals 914, 916, respectively. In interval 918 the magnitude can be ramped down by slowing the vibration motor to a halt. Thus, chart 900 shows an example of modulating the vibration magnitude over time where the magnitude is varied between non-zero values (i.e. the motor is not turned off, as in pulsing patterns).

Figure 10:
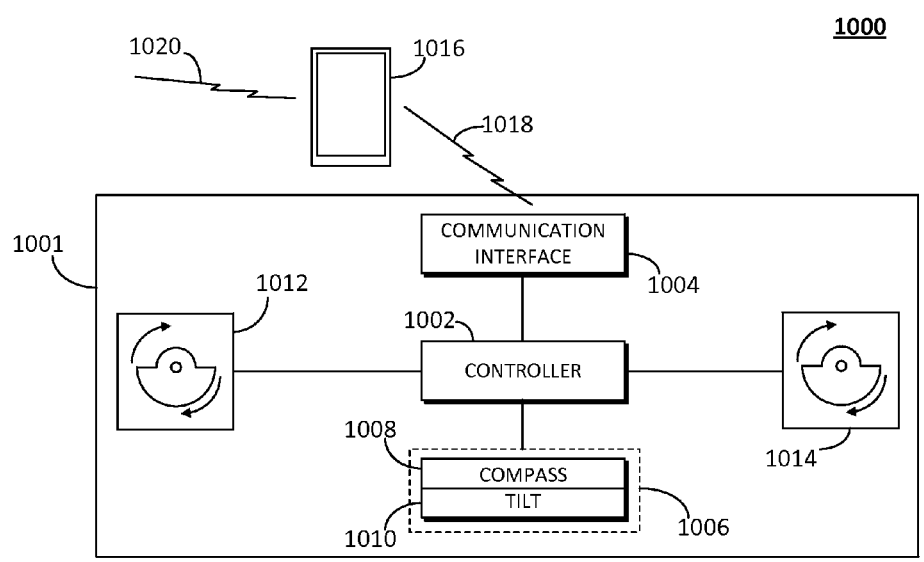
FIG. 10 is a system diagram of a vibration alert system that provides orientation and guidance to a user in accordance with some embodiments.

FIG. 10 is a system diagram of a vibration alert system 1000 that provides orientation and guidance to a user, in accordance with some embodiments. A vibration alert accessory 1001 is employed in a form factor that allows a user to perceive direction and orientation, such as, for example, in a helmet. The vibration alert accessory 1001 includes a controller 1002 that is coupled to a communications interface 1004, which can be a local wireless network radio communications interface (e.g. IEEE 802.11 or 802.15). The controller 1002 can receive messages from an associated communication device 1016 via signals 1018 received by the communications interface 1004. The controller 1002 is further coupled to orientation components 1006 which can include an electronic compass 1008 and a tilt sensor 1010. The compass can be oriented in a known orientation with respect to the apparatus (i.e. helmet) in which it is mounted so as to allow the controller to determine the direction in which the apparatus in oriented (i.e. in which direction the user is looking). The tilt sensor 1010 can comprise a three dimensional array (i.e. three mutually perpendicular axes) of micro-electromechanical switches having various resistances so as to indicate the direction of gravity and other acceleration, and therefore the tilt orientation of the apparatus in which the vibration alert accessory 1001 is disposed can be determined. The communication device 1016 can include location determining components (e.g. satellite positioning receiver system), so that the location of the user can be determined. The controller 1002 is further coupled to a plurality of vibrator motors, including a first vibrator motor 1014 and a second vibrator motor 1012. The first vibrator motor 1014 can be mounted on a right side of the apparatus in which the vibration alert accessory 1001 is housed, and the second vibration motor can be mounted on a left side of the apparatus in which the vibration alert accessory 1001 is housed. Thus, the user can not only be alerted as to an imminent danger, but also the orientation of the danger relative to the user's present position and orientation. The communication device 1016 can receive messages 1020 indicating such a danger or other situation to which the user's attention is to be drawn. The message 1020 can include location information indicating a location of the danger or other thing to which the user's attention is to be drawn. The communication device 1016 can form an alert message 1018 that is sent to the vibration alert accessory 1001. The alert message 1018 can indicate the location of the danger (i.e. coordinates), as well as the user's present position as determined by the communication device 1016, which can be used by the controller 1002 to determine the user's orientation with respect to the danger and the direction of the danger from the user's position. Accordingly, the controller can then activate the vibration motor closest to the direction of the danger to indicate to the user the direction of the danger. This process can be ongoing as the user changes position and orientation, the controller can adjust the vibration of the plurality of the vibration motors accordingly, increasing and decreasing the vibration amplitude of each vibration motor in correspondence with their orientation to the danger. That is, the vibration motor 1012, 1014 closest to the direction of the danger can have the highest vibration magnitude, while the vibration motor 1012, 1014 farthest from the direction of the danger can have the smallest, or no vibration magnitude, and this can be changed based on position, location, and orientation input from the communication device 1016, and the orientation components 1006. The communication device 1016 can periodically or continuously update the vibrational alert accessory as to the user's present position so that the controller can, in real time, adjust the vibrations of the first and second vibrator motors 1012, 1014 to indicate the orientation of the thing to which the user/wearer's attention is to be drawn is located with respect to the user's present position and orientation. Such alerting can be used, for example, in construction sites, firefighting settings, military settings, and so on. For example, a person in need of medical attention can activate a medical alert which results in the person's location being transmitted to an on-site medic. The medic's headgear, using directionally oriented vibration of vibration motors such as vibration motors 1012, 1014, can be silently directed to the person in need of aid. The identification and location of the situation to which attention is to be drawn can be determined, for example, by on-site personnel who can use their respective communication device to enter information indicating the direction, and/or location of the danger. That information can be then propagated to a plurality of others in the vicinity of the danger for use in vibration alerting to indicate orientation, location, and so on. Likewise, the multiple vibration motors 1012, 1014 (and others, if present), can be used to guide the user in conditions where visibility may be compromised. For example, the position and orientation of the user can be used to alert the user towards the direction of an exit from a building in a firefighting situation.

Figure 11:
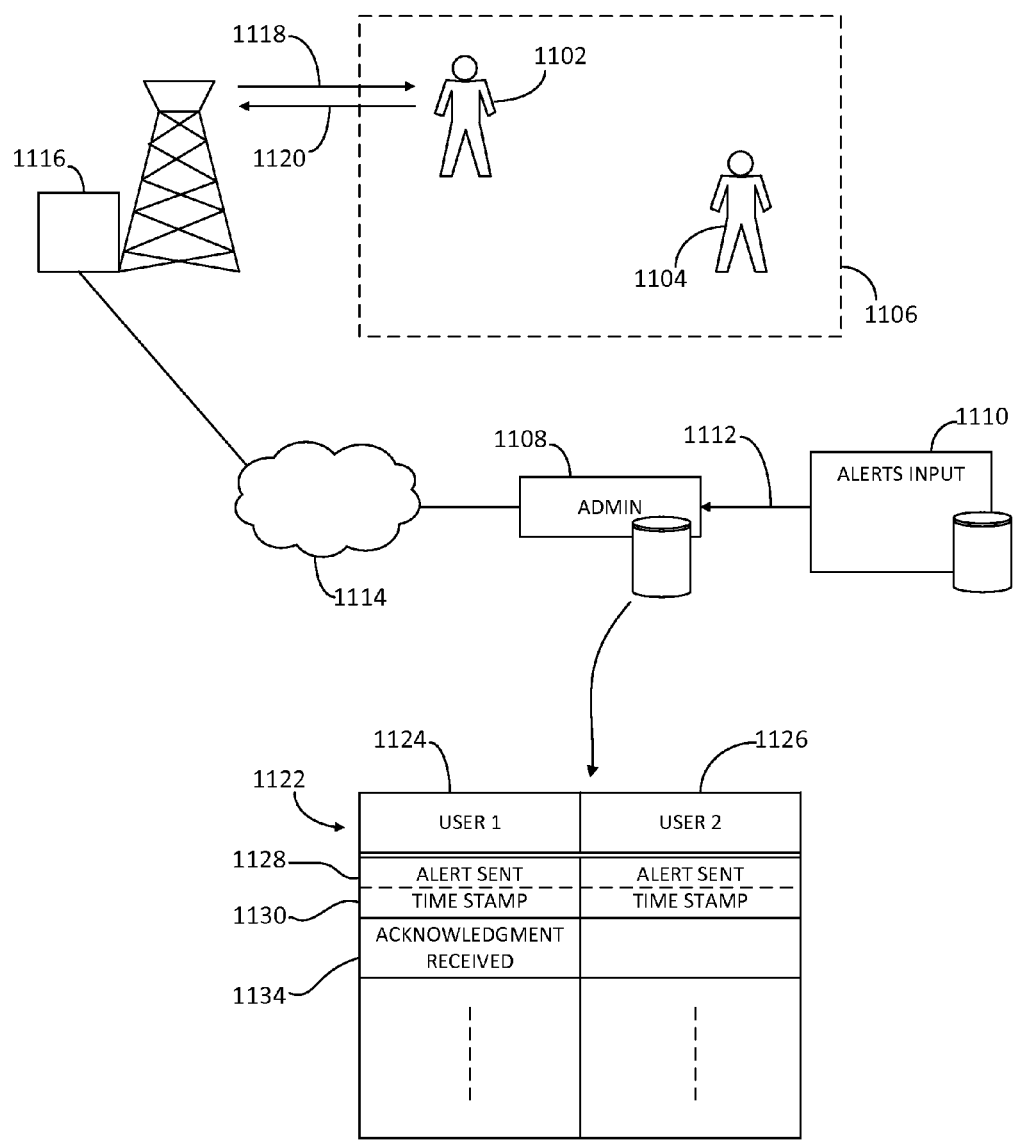
FIG. 11 is a system diagram of an alert system for logging alerting activity and user acknowledgements of users associated with an organization in accordance with some embodiments.

FIG. 11 is a system diagram of an alert system 1100 for logging alerting activity and user acknowledgements of alerts by users associated with an organization in accordance with some embodiments. A plurality of users such as a first user 1102 and a second user 1104 are associated with an organization (e.g. a construction operation, public safety, military, security, etc.). The users 1102, 1104 can be located within a region 1106 that can be, in some embodiments, a geo-fenced region, although it is not necessary that the user's be in a geo-fenced region in all embodiments. An administration entity 1108 can operate in a supervisory role and provide alerts to user 1102, 1004, etc. in region 1106, or which are otherwise affiliated with the organization. For example, an alert message 1110 can be provided 1112 to the administration entity 1108 for propagation to the users. The alert can indicate some urgent matter as described with reference to previous figures. The administrative entity 1108 can send a message through a network 1114 to a wide area radio communications site 116, which can transmit the message to the users. Thus a transmitted message 1118 can be received by user 1102. The transmitted message can include information, as well as an indication of a preferred alert pattern to be used. The communication device used by a user receiving the message 1118 can process the message upon receiving it, and determine what form of alerting to use. When a strong vibration alert is needed (e.g. for urgent messages), the user's communication device will enable an associated vibration alert accessory to create a vibratory alert. In response, user 1102 can respond to the message by reading or listening to the user's communication device, or by simply pressing a button at the vibration alert accessory. Once the user acknowledges the alert (e.g. by pressing a button, answering a call, etc.). The user's acknowledgement indicates the user received the alert. An acknowledgment message 1120 can then be generated by each user who has acknowledged the message as received, and sent back to the administration entity 1108. The alerts may or may not be vibration alerts. In some embodiments, for non-urgent alerts, the communication device used by a user can generate an audible alert and/or a low magnitude vibration alert. If the user does not acknowledge the alerting by the communication device within a preselected period of time, the communication device can then form a vibration alert message that is transmitted to the vibration alert accessory associated with the communication device and worn or carried by the user. By avoiding using the vibration alert accessory for non-urgent alerts in this manner, battery life of the vibration alert accessory can be prolonged. The user can acknowledge the alert at either the communication device or the vibration alert accessory, and an acknowledgement message can be transmitted back to the administration entity.

The administration entity 1108 can maintain a record 1122 of all alerts and individual acknowledgements received. For example, a column 1124 can correspond to the first user 1102, and a second column 1126 can correspond to the second user 1104. In each column a record can be kept of, for example, an alert being sent 1128, along with a time stamp 1130 indicating when the alert was sent. Similarly an acknowledgment entry 1134 can indicate that the user acknowledged the alert (with or without a timestamp and with or without the acknowledging user's location). In the event that user does not acknowledge an alert, the administrative entity 1108 can send a message to user's nearby the non-acknowledging user to interact with the non-acknowledging user, which can prompt the non-acknowledging user to then acknowledge the alert, or prompt those checking on the non-acknowledging user to seek assistance if, for example, the non-acknowledging user is in need of assistance.

The records 1122 can be used, in some embodiments, to reduce insurance costs. Since the organization can show alerting and acknowledgement compliance, the organization may be entitled to a discount on liability insurance. The record 1122 can also be used to show compliance with regulations, such as when the vibration alert device is disposed in a safety article (e.g. high visibility vest, hard hat/helmet, etc.), indicating, by the acknowledgements, that the users are using their safety gear in which the vibration alert accessory is disposed.

Figure 12:
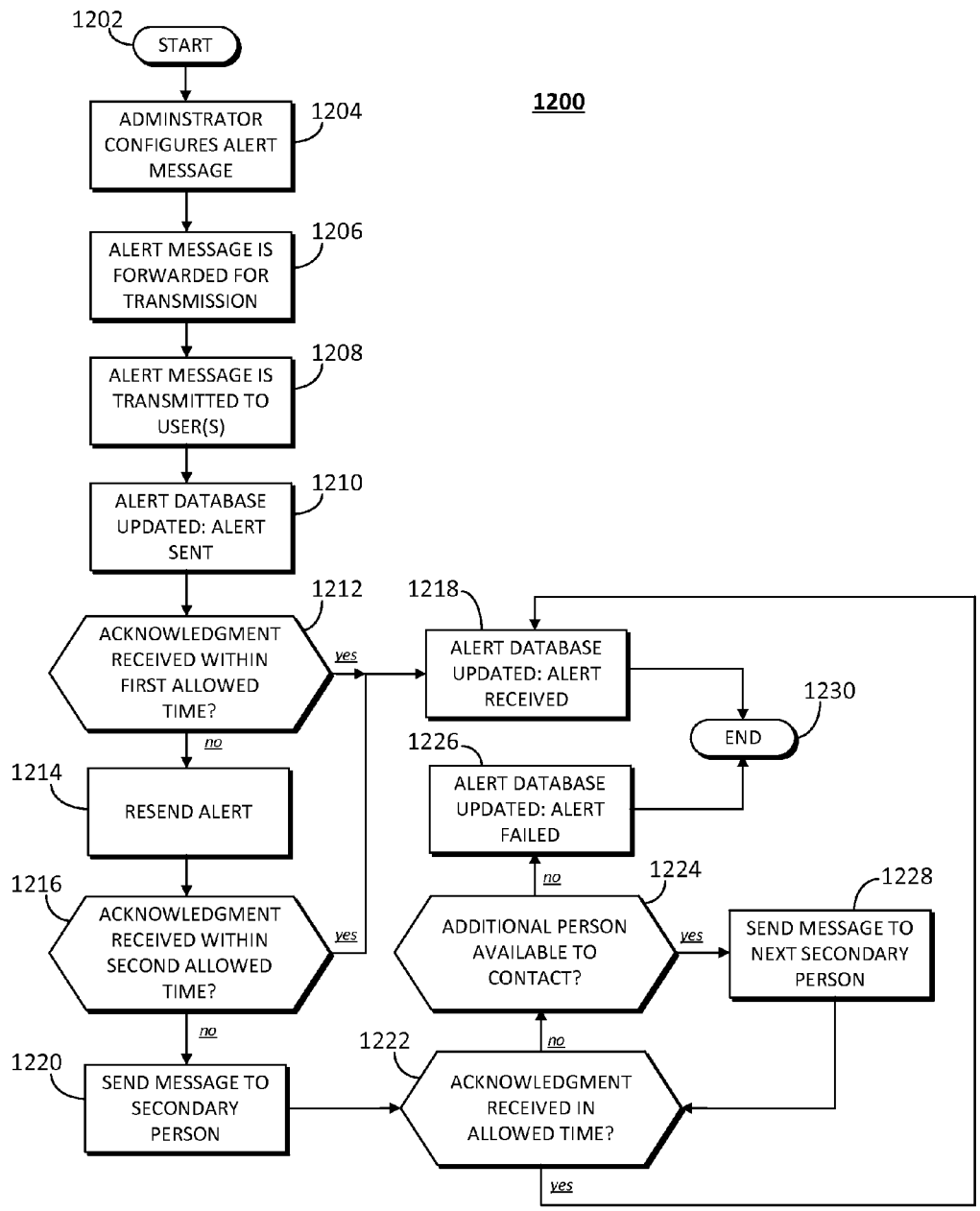
FIG. 12 is a flow chart diagram of a method for logging alert transmissions and acknowledgments in accordance with some embodiments.

FIG. 12 is a flow chart diagram of a method 1200 for logging alert transmissions and acknowledgments in accordance with some embodiments. The method 1200 can be used in a system using embodiments such as that shown in FIG. 11, for example. At the start 1202 the system is operational, and includes, among other elements, a computer system which can include a backend server and database management system configured to create, store, and modify records of messages sent to users, and acknowledgements received from users in response. The computer system is also configured to generate messages to be sent to users. The system further includes a wireless communication system that is accessible or otherwise interfaced with the computer system to facilitate the wireless transmission of messages to the communication devices of the users. The wireless communication system can be, for example, a cellular telephony system, or a subscription to, or lease of resources of a cellular telephony system. The system also include one or more communication devices that receive messages from the computer system, and other communication devices, via the wireless communication system. The communication devices can be, for example cellular telephone devices, portable two-way radio devices, and so. Each communication device can be associated with a respective vibration accessory device. The communication device can be connected to the vibration accessory device through a wired or wireless connection. The vibration accessory device comprises one or more vibration motors (including a mass for creating vibrations) that vibrate at various magnitudes of vibration, according to a vibrations pattern, upon the communication device receiving a message (and in response activating the vibration accessory device).

Once the system is operation, the method 1200 can commence at step 1204 where, for example, and administrator or other person can generate a message to be transmitted to the communication device or devices of one or more people. The message is referred to as an alert message since, upon being received at a communication device the communication device notifies the user of the communication device by an alert. Specifically, the alert is a vibration alert where the user is notified through tactile sensation generated by the communication device or an associated vibration alert accessory. The message can be, for example, a text message, a voice message, the commencement of a telephone call, the commencement of a two way radio call, and so on. Once the message is created, or commenced, the message is then forwarded to the wireless communication system in step 1206. In step 1208 the wireless communication system transmits the message or the indication of the commencement of a call, to the user or users communication device. In step 1210 the computer system logs the message in an alert database in a record (e.g. 1122 of FIG. 11) for each user to whom the message was directed. As a result of step 1208, the communication device of the user or users to whom the message was directed receives the message (or indication of a message) from the wireless communication system, and processes the message. In processing the message, the communication device can determine a priority of the message, such as by reading a priority parameter in metadata sent with the message, or based on who sent the message, or by evaluating the voice of the speaker (in the case of a two way radio message, e.g. FIG. 8). The communication device can then determine whether to activate an associated vibration alert device to ensure that the user feels the alert. The communication device can further determine if and when the user responds or acknowledges the message, and transmit an acknowledgement to the sender of the message.

Accordingly, in step 1212 the system monitors communications for an acknowledgement to the message sent in step 1206 from each user to whom the message was sent. If an acknowledgment is received within a preselected time, then the method proceeds to step 1218 and logs the acknowledgement in the database to indicate that the messaged user received and acknowledged the message. The time that the message was sent, and the time of acknowledgement can be logged in the database entry for the user. The acknowledgement can be produced automatically by the user pressing a button on a vibration alert accessory that is vibrating in response to the communication device receiving the alert message. Once the user presses the button to stop the vibration, the vibration alert accessory can indicate to the communication device that user input was received. In some embodiments the user may be required to enter a response in the communication device after stopping the vibration alert accessory from vibrating. In some embodiments the acknowledgment can be inferred, such as by detecting the user moving away, or towards, an indicated location in the alert message. In some embodiments the specific type of acknowledgement can be logged by the database. That is, the acknowledgment message received at the system can indicate whether the user only pressed the button on the vibration alert accessory, stopped the alert at the communication device, moved to or from an indicated location, or some other activity that indicates the user received and responded to the alert message.

If, in step 1212, an acknowledgement is not received in a first allowed time, the method 1200 can, in step 1214, resend the message or alert. In step 1216 the method 1200 waits for an acknowledgement during a second time period. If the acknowledgement is received within the second time period then the method 1200 proceeds to step 1218 and the acknowledgement is logged. If after the second time period has elapsed and no acknowledgement is received, the method 1200 can attempt to try alerting a secondary person in step 1220, who can be someone known to be approximately co-located with the intended alert target, or someone who knows the intended alert target (e.g. family member, other employee, etc.). In step 1222 the system waits for an acknowledgement from the secondary person. If an acknowledgment is received from the secondary person the method 1200 proceeds to step 1218 and the acknowledgement is logged, and may indicate that it was necessary to alert the secondary person. If acknowledgment is received in step 1222, then in step 1224 the system determines whether there is another person who can be alerted, and if so then the process is repeated with the next secondary person in step 1228. If the list of secondary persons associated with the intended alerting target person have been exhausted, then the system logs a failure in the alerting database in step 1226. Once either a success or failure is logged in steps 1218 or 1226, the method ends 1230 for the particular iteration of the method 1200. It will be appreciated by those skilled in the art that the method 1200 represents some embodiments that can be implemented in accordance with the functions and processes described in method 1200. Variations of the processes of method 1200 can likewise be implemented without departing from the scope of method 1200, which is to transmit alert messages to users associated with a system, and log the results of the users acknowledging the alerts of failing to acknowledge the alerts in order to procedure a history of alerting activity to show compliance with polices of the operator of the alerting system.

Figure 13:
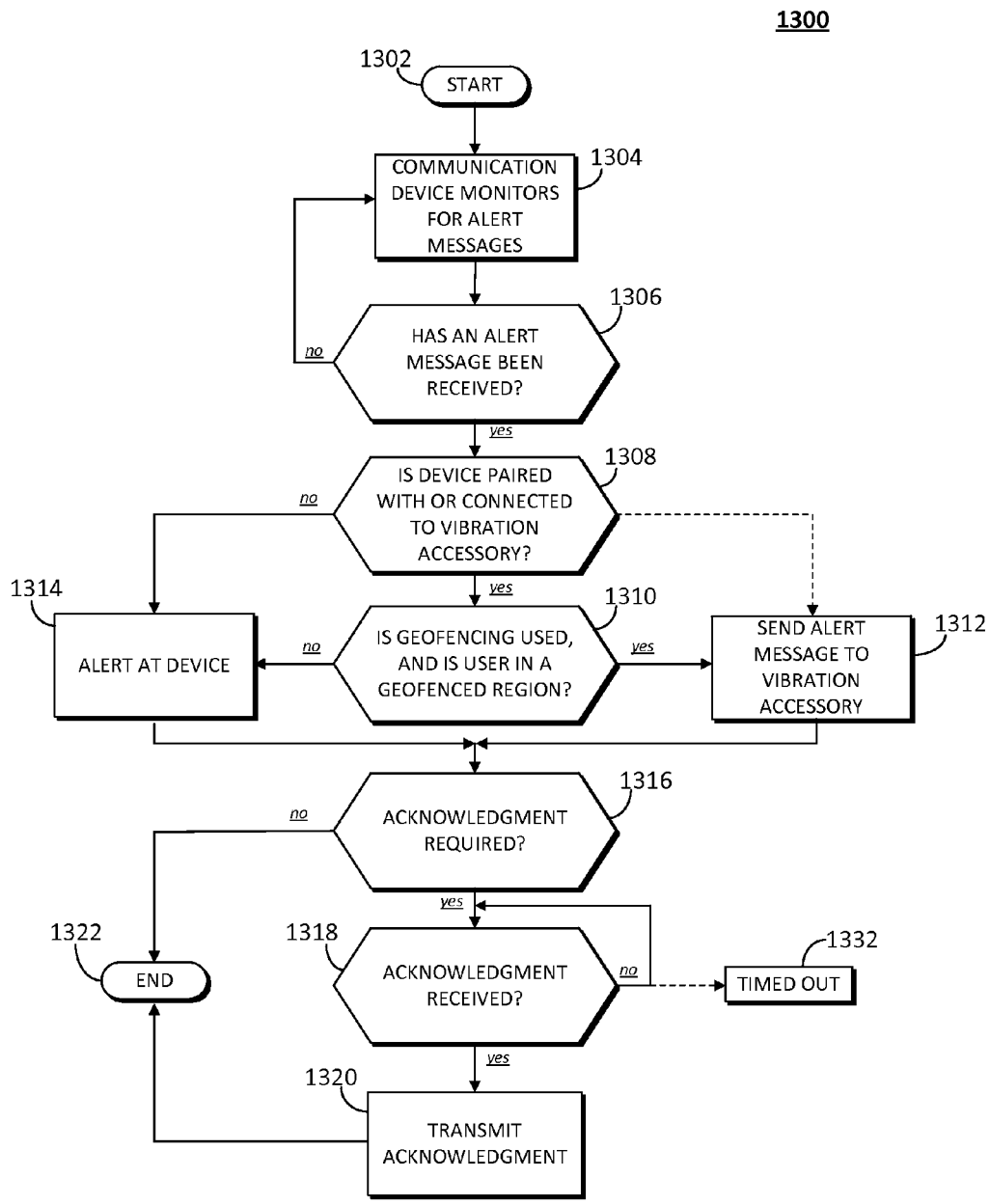
FIG. 13 is a flow chart diagram of a method for responding to reception of a message at a communication device in accordance with some embodiments.

FIG. 13 is a flow chart diagram of a method 1300 for responding to reception of a message at a communication device in accordance with some embodiments. At the start 1302 the communication device is powered on and able to received alert messages. In step 1304 the communication device monitors it communication medium for alert messages intended for the communication device. For example, the communication device can be a cellular telephone device that is subscribed to a cellular telephony communication service, and monitors a broadcast control channel of the cellular telephony communication service (in a cell in which it is located) for pages on the broadcast control channel that identify the communication, by, for example, an international mobile subscriber identifier (IMSI) or an international mobile equipment identifier (IMEI) of the communication device, or another identifier uniquely associated with the communication device. In some embodiments, the alert message can be intended for all communication devices in an area, and the telephony communication service can indicate it is a cell-wide or system-wide alert message. Once the communication device identifies that there is an alert message destined for the communication device, it will communicate with the wireless communication system to acquire the alert message. In step 1306 the method 1300 determines whether an alert message has been received at the communication device. If not, it simply keeps monitoring, repeating steps 1304, 1306. Upon receiving an alert message, the method can proceed to step 1308 in which a process is undertaken to determine whether the communication device is presently paired or connected with a vibration accessory device. If there is no vibration accessory coupled or connected to the communication device, then in step 1314 the communication device attempts to alert the user by using, for example, a conventional vibrator, generating an audible alert sound, and so on. If the communication device is coupled or connected to a vibration accessory device, then in step 1310 the communication device can determine whether the user is presently in a geofenced region, meaning a predefined region where the communication device will attempt to alert via the vibration accessory. The geofenced area can be, for example, a construction site. If geofencing is used and the user is not in the geofenced region then the communication device can generate the alert directly in step 1314 on the assumption that the alert generated by the vibration accessory is not needed. Alternatively, if geofencing is used, and the user is in the geofenced region, then the communication device can send the alert notification to the vibration accessory in step 1312 to allow the vibration accessory to generate an alert that is more likely to be perceived by the user. Likewise, if in step 1310 it is determined that geofencing is not being used, then the communication device can select either step 1312 or 1314 for alerting the user, and the selection of which can be set, for example, by user settings in configuring the alerting application on the communication device. In some embodiments, as indicated by the dashed line from step 1308 to step 1312, the presence of the vibration accessory causes a default alerting by the vibration accessory, regardless of other conditions.

Once the alert has been generated, either in step 1312 or 1314, the method proceeds to step 1316 where it is determined whether an acknowledgment is required. If not, the method simply ends 1322. If an acknowledgment is required, then in step 1318 the method waits for the user to provide an input, or take some action that reasonably indicates that the user perceived the alert. Once the user provides an input indicating the user has perceived the alert, then in step 1320 an acknowledgment is transmitted in response to the alert message. The acknowledgment message can result, for example, from the vibration accessory indicating to the communication device that the user provided an input (i.e. pressed a button). The acknowledgment message can include a message identifier used in the alert message so that the system can correlate the acknowledgment with the alert message in the database log. Once the acknowledgment is transmitted then the method can end 1322. In some embodiments step 1318 can time out 1332 in order to avoid, for example, discharging the battery of the alert device. In which case, rather than continuing the vibration alert the vibration alert accessory can indicate an alert was received by, for example, blinking a light source of the vibration accessory. Upon noticing this type of secondary alerting, a user can check the communication device using the alerting application for further information.

Embodiments described herein provide the benefit of alerting people in a way that allows they to perceive the alert in conditions where conventional alerting (i.e. a cellular phone) is insufficient due to ambient noise and vibrations, and keeping a record of the alerting activity as well as response to the alerts in order to ensure, for example, organizational compliance with alerting requirements. Conditions under which such heightened alerting may be required include construction sites, during emergency operations, in military settings, and so on. By requiring responses (acknowledgements) to alerting, the members of the organization also become disciplined to respond to alerts and messages that require action, which can improve the safety and efficiency of the organization.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The use of "software," and other references to code herein, are to be construed as referring to the physical configuration of a physical media, such as, for example, electronic media (both active and passive), optical media, magnetic media, and so on, which can be read (i.e. transferred) to electronic media in a processor or other computational structure for logic operations to produce output that is also used to configure physical media and/or drive other circuitry connected to the processor, accordingly. The physical configuration of the media is specified by design to cause the processor to provide an output according to its physical design as a collection of circuitry and circuit components. As such, any reference to software or other code is not to be construed as referring to any abstract idea which generally merely describes the intended function of the actual software. It will be appreciated by those skilled in the art, however, that software can be designed in a wide variety of alternative implementations to achieve the same general functions.

An embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. An alert system, comprising:
   a plurality of communication devices, each communication device associated with a respective one of a plurality of users and a respective one of a plurality of vibration alert accessories, and upon a communication device of the plurality of communication device receiving an alert message the communication device is operable to forward an alert to the respective associated vibration alert accessory, each vibration alert accessory is operable to vibrate in response to receiving an alert from its associated communication device, each vibration alert accessory includes an input operable to allow the respective user to acknowledge alerts received by the vibration alert accessory, and wherein each vibration alert accessory is operable to, upon actuation of the input by the user, turn off the vibration, and upon the user providing the input the vibration accessory is operable to transmit a message to the associated communication device which then transmits an acknowledgment message;
   an administration entity operable to transmit alert messages to one or more of the plurality of communication devices, and is further operable to receive the acknowledgements from the communication devices in response to transmission of the alerts;
   a database in which the administration entity maintains a record of alert messages that are transmitted, and acknowledgments received in response to the alert messages for each user.

2. The alert system of claim 1, wherein the communication devices coupled to an associated vibration alert accessory are coupled by a wired link.

3. The alert system of claim 1, wherein the communication devices coupled to an associated vibration alert accessory are coupled by a wireless link.

4. The alert system of claim 1, the alert message includes an indication of a location, wherein the communication device, upon receiving the alert message, determines whether the communication device is within a geofenced area in which the location is located, and based on the location of the communication device with respect to the geofenced area, the communication device determines whether to alert the user at the communication device or at the vibration alert accessory.

5. The alert system of claim 1, wherein, when a user fails to acknowledge the alert message within a first time period, the administration entity resends the alert message.

6. The alert system of claim 5, wherein, when the user fails to acknowledge the resent alert message within a second time period, the administration forwards the alert message to a secondary person associated with the user.

7. The alert system of claim 1, wherein the record for each alert includes a timestamp indicating the time at which the alert message was sent.

8. The alert system of claim 7, wherein the record for each alert that is acknowledged contains a timestamp indicating when the acknowledgment was received at the administration entity.

9. The alert system of claim 1, wherein the administrative entity further maintains a record of failures to acknowledge alerts sent to communication devices.

10. A method of operating an alerting system, comprising:
generating an alert message at an administration entity;
transmitting the alert message to at least one communication device that is uniquely associated with a user;
determining whether a response has been received at the administrative entity as a result of transmitting the alert message;
logging a record of the alert message and either an acknowledgement to the alert message or a failure to acknowledge the alert message;
receiving the alert message at the communication device;
the communication device, responsive to receiving the alert message, determining whether the communication device is coupled to a vibration accessory, and when the communication device is coupled to the vibration accessory, transmitting an alert message to the vibration accessory, wherein receiving the indication that the user has acknowledged the alert comprises receiving an indication;
receiving an indication from the user that the alert message has been acknowledged at the communication device from the vibration accessory; and
transmitting an acknowledgement of the alert message to the administration entity by the communication device in response to receiving the indication from the vibration accessory.

11. The method of claim 10, further comprising, when the communication device is not coupled to a vibration accessory, the communication device generating an alert in response to receiving the alert message.

12. The method of claim 10, wherein transmitting the alert message to the vibration accessory comprises transmitting the alert message wirelessly to the vibration alert accessory.

13. A method for ensuring organizational alerting compliance, comprising:
generating, at an administration entity, alert messages for specific members of an organization;
transmitting the alert messages as they are generated to respective ones of communications devices, where each respective communication device is uniquely associated with a respective member of the organization, and wherein each communication device is operable to be associated with a respective vibration accessory, and wherein, upon receiving an alert message the receiving communication device transmits an alert to the vibration accessory which vibrates in response, the vibration accessory being operable to receive a user input to indicate acknowledgement transmits and in response transmit an acknowledgement to the associated communication device, and wherein the communication device is operable to transmit a response to the administration entity in response to receiving the acknowledgment from the vibration accessory;
determining whether a response is received for each alert message transmitted by the administration entity; and
logging a record of each alert message that indicates which member of the organization the alert message was transmitted and an indication as to whether a response to the alert message was received.

14. The method of claim 13, wherein generating the alert messages includes generating at least some of the alert message to include an indication of a location in a region in which members of the organization are located.

* * * * *